United States Patent
Yong

(10) Patent No.: US 6,234,804 B1
(45) Date of Patent: May 22, 2001

(54) THORACIC TRAINING MODEL FOR ENDOSCOPIC CARDIAC SURGERY

(76) Inventor: Peter Yong, 1124 W. Carson St., RB-2, Torrance, CA (US) 90502

( * ) Notice: Subject to any disclaimer, the term of this patent is extended or adjusted under 35 U.S.C. 154(b) by 0 days.

(21) Appl. No.: 09/517,413

(22) Filed: Mar. 2, 2000

Related U.S. Application Data

(60) Provisional application No. 60/122,543, filed on Mar. 2, 1999.

(51) Int. Cl.⁷ .................................... G09B 23/28
(52) U.S. Cl. ................. 434/267; 434/268; 434/272; 434/274
(58) Field of Search .................... 434/262, 265, 434/267, 268, 272, 270, 274, 275

(56) References Cited

U.S. PATENT DOCUMENTS

| | | | |
|---|---|---|---|
| 3,999,309 | * | 12/1976 | Gonzalez ............... 434/272 |
| 4,288,222 | * | 9/1981 | Kling .................... 434/272 |
| 4,773,865 | * | 9/1988 | Baldwin ................. 434/268 |
| 4,938,696 | * | 7/1990 | Foster ................... 434/267 |
| 5,061,188 | * | 10/1991 | McCollum ............. 434/272 |
| 5,634,797 | * | 6/1997 | Montgomery ......... 434/268 |
| 5,800,179 | | 9/1998 | Bradford E. Bailey ... 434/262 |
| 5,947,744 | * | 9/1999 | Izzat .................... 434/272 |
| 6,062,866 | * | 5/2000 | Prom ................... 434/268 |

OTHER PUBLICATIONS

Pacific Research Laboratories, *Sawbones* Medical Catalog, 1999, p. 38.

* cited by examiner

Primary Examiner—Jacob K. Ackun
Assistant Examiner—Kit Fernstrom
(74) Attorney, Agent, or Firm—Knobbe, Martens Olson & Bear, LLP

(57) ABSTRACT

A method and an apparatus for training for cardiac surgery using endoscopic techniques are provided. The apparatus comprises a model thorax having an internal cavity and a plurality of ribs, intercostal spaces between the ribs through which an endoscopic instrument can be inserted during use of the model, and a heart located in the internal cavity and removably connected to the model, the heart having a coronary artery on which surgical training can be performed during use of the model. The apparatus also comprises a sternum located on the anterior aspect of the thorax, and at least one internal mammary artery located on a posterior surface of the sternum. The apparatus can also include a fluid system in communication with the heart and providing pressurized fluid to the coronary artery, such that cutting the artery simulates bleeding as the pressurized fluid effuses from the artery.

13 Claims, 6 Drawing Sheets

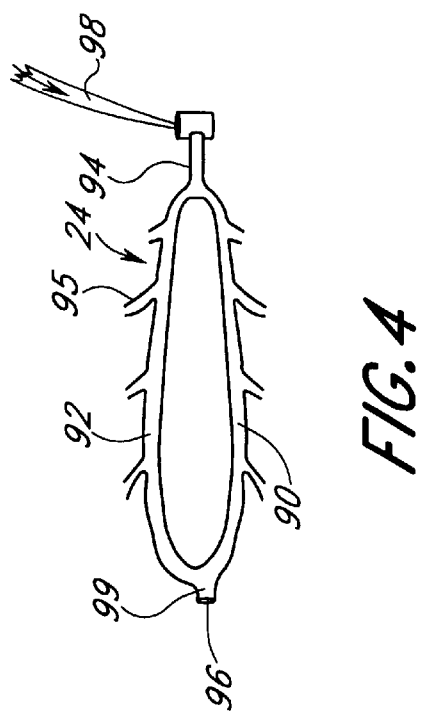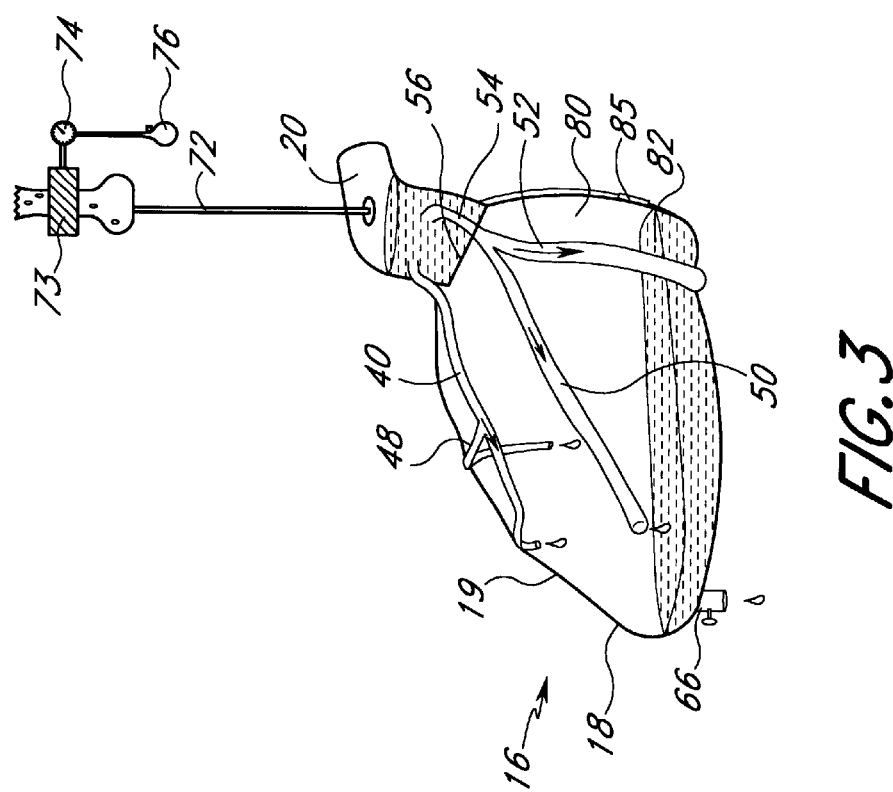

THORACIC TRAINING MODEL FOR ENDOSCOPIC CARDIAC SURGERY

RELATED APPLICATION

This application claims priority under § 119(e) from Provisional Application No. 60/122,543, filed Mar. 2, 1999.

FIELD OF THE INVENTION

This invention relates to a thoracic model specially designed for use in training for endoscopic cardiac surgery.

BACKGROUND OF THE INVENTION

Traditionally, coronary artery bypass graft (CABG) surgery has been performed through a median sternotomy, which is a hole in the middle of the chest. This involves sawing the sternum, or breast bone, in half longitudinally, thereby opening the chest. A standard 30-cm median sternotomy incision has been referred to as a "manhole" incision. Beginning around 1996, cardiac surgeons began performing minimally invasive CABG.

Minimally invasive techniques use an approximately 8-cm incision "keyhole" in the fourth intercostal space, the space between the fourth and fifth ribs.

There are two primary types of minimally invasive cardiac surgery: (1) minimally invasive direct coronary artery bypass (MIDCAB), which is performed while the heart is still beating; and (2) the port-access operation, performed on an arrested heart with the use of cardiopulmonary bypass and pharmacologic cardioplegia (i.e., using potassium chloride to temporarily stop the heart from beating).

When cardiac surgery is performed on an arrested heart, blood is pumped through the body and oxygenated by an external machine, the cardiopulmonary bypass pump. This machine takes deoxygenated blood from the systemic venous system, oxygenates the blood through a semipermeable membrane, and returns this oxygenated blood to the systemic arterial circulation. This mechanism effectively bypasses the lungs, which are the normal means for oxygenating blood. In the standard CABG procedure, access to the systemic venous circulation is made through a cannula (a thin, hollow tube) inserted into the right atrium or closely related structure, such as the superior vena cava (the large vein returning blood to the heart from the head and arms). Access to the systemic arterial circulation is made through a cannula inserted into the aorta (the largest artery in the body), which carries blood away from the heart and to the body. The surgeon also cross clamps the aorta around the level of the aortic arch (near the heart).

By contrast, in minimally invasive CABG procedures, a physician accesses the systemic venous circulation through a cannula inserted into the femoral vein at the level of the groin, and the physician accesses the systemic arterial circulation through a cannula inserted into the femoral artery. The latter cannula is guided through the femoral artery superiorly, up to the aortic arch. At the tip of this aortic cannula, an endo-aortic balloon is inflated to occlude the aorta from within. This balloon inflation serves the same purpose as the aortic cross-clamping performed in standard CABG procedures.

In methods of CABG that are entirely endoscopic, the surgeon makes two or three small (e.g., 2-cm) incisions in the chest for placement of an endoscope and surgical instruments.

To become proficient with any of these surgical techniques, especially the endoscopic techniques, requires practice. Cadavers can sometimes be used to practice surgery, but they are in short supply and expensive. Also, because cadavers do not bleed, it is hard to tell if surgical anastomoses have been performed successfully. There is thus a need for alternative ways to become proficient in the endoscopic cardiac surgery.

SUMMARY OF THE INVENTION

There is thus provided a surgical model for use with training, for cardiac surgery using endoscopic techniques. The model includes a thorax having anatomically correct representations of a plurality of ribs, at such that endoscopic instruments can be inserted between the ribs (i.e., in the intercostal spaces) during use of the model. An anatomically correct representation of a heart is located in an anatomically correct position in the thorax and is removably connected to the model. The heart has at least one major coronary artery on which surgical training can be performed during use of the model. A sternum is removably fastened to the anterior aspect of the thorax of the model, the sternum having a representation of at least one internal mammary artery on a posterior surface of the sternum.

In a further embodiment, the model has a removable skin enclosing or surrounding the model. Further, the skin advantageously comprises landmarks, including at least one of a nipple or an umbilicus. Moreover, a further embodiment comprises a fluid system in fluid communication with the heart and providing pressurized fluid to the coronary arteries so that cutting, the arteries simulates bleeding when the pressurized fluid effuses from the coronary artery. The fluid system is preferably also in fluid communication with the internal mammary arteries and provides pressurized fluid to the internal mammary arteries so that cutting the internal mammary arteries simulates bleeding when the pressurized fluid effuses from the internal mammary artery. Additionally, in certain embodiments there are representations of a pair of lungs, collapsed lungs in some embodiments, on opposing sides of the heart. Moreover, at least one of the arteries can taper in diameter, reducing in size toward its distal end.

The arteries are also preferably form-ed of a selected size, and formed of a selected material, selected to simulate the physical characteristics sensed by a surgeon performing endoscopic bypass surgery on a live person. Advantageously, there is a space between the posterior surface of the sternum and the anterior surface of the heart of up to about 3 inches when the heart is empty of blood.

BRIEF DESCRIPTION OF THE DRAWINGS

FIG. 3 is a schematic side view of one embodiment of the model heart and an IV bag assembly.

FIG. 4 is a schematic drawing of one embodiment of the internal mammary artery assembly.

DETAILED DESCRIPTION OF THE PREFERRED EMBODIMENT

Figure 1:
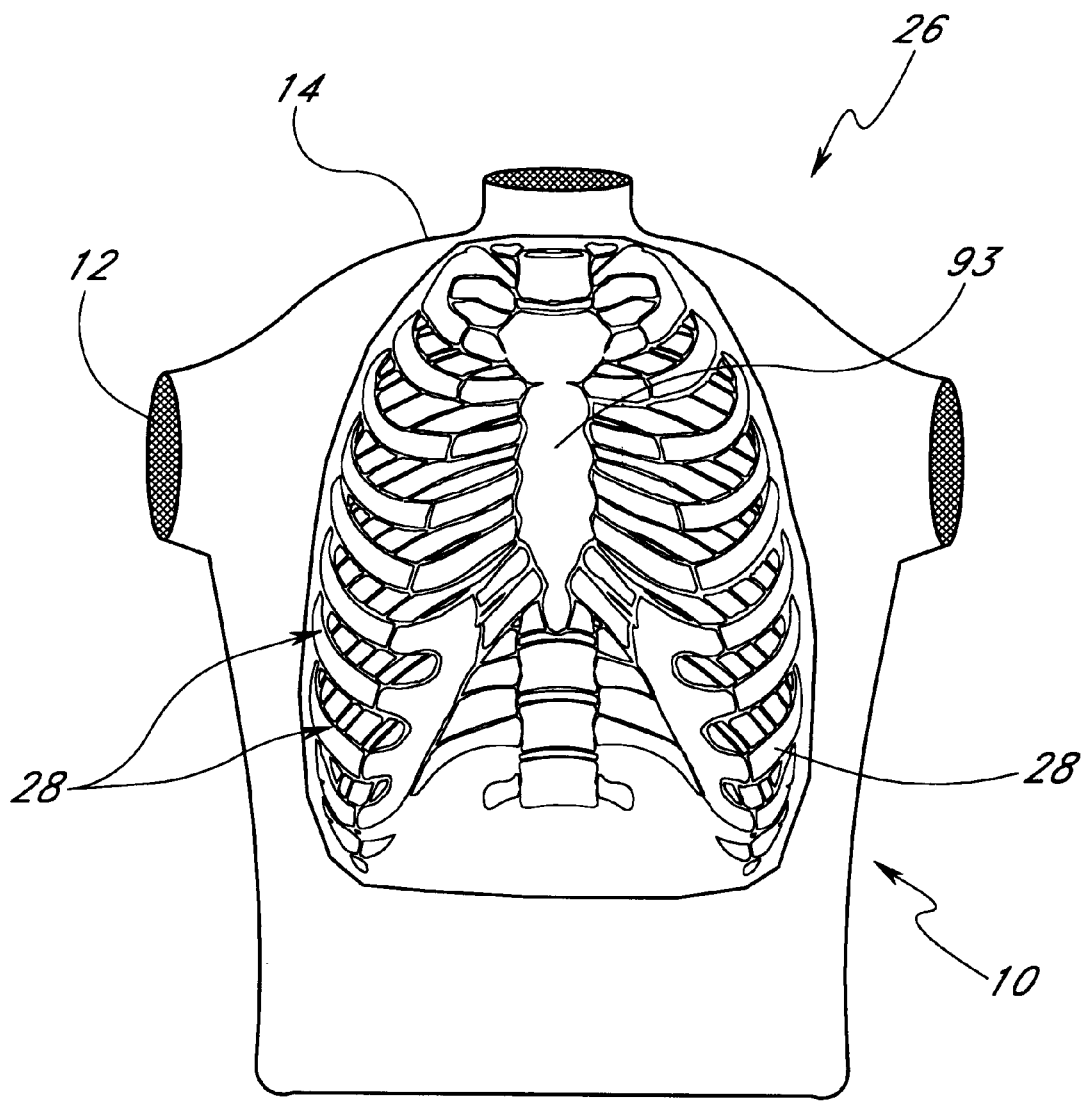
FIG. 1 is a frontal cut-away view of the thoracic model.

In describing the thoracic model, the terms "heart," "artery," "skin," and the like are used in many instances herein to mean nonbiological representations, or models, of the counterpart human anatomical structures. Referring to FIG. 1, the thoracic model 10 is approximately the same size and shape as a human thorax, and is thus portable. While simulations of the arms could be provided, advantageously they are not included in the model. Thus, the model is truncated at or near the shoulders 12.

The model 10 has several components that are removable and replaceable: (1) the skin 14; (2) the assembly 16 of the heart 18, coronary arteries 20, and great vessels 22 (pulmonary arteries and aorta); and (3) the internal mammary or internal thoracic arteries 24. In the model 10, these simulated body parts are incised and manipulated by the surgeon during training, and are disposed of after the procedure. They are thus preferably disposable and replaced after each training session, although they may be reusable for at least a few practice sessions, depending on the amount of damage inflicted during training. The remaining components of the training model 10, including the thoracic shell 26, ribs 28, lungs 30, and trachea 32, are all preferably reusable from one procedure to the next.

The size, shape, and configuration of the heart model 16, and the anatomy of the blood vessels and their interrelationship with adjacent structures, such as the trachea 32, are all accurate representations of anatomical reality. In some embodiments, the arteries are formed of a selected size, and formed of a selected material, selected to simulate at least one physical characteristic sensed by a surgeon performing endoscopic bypass surgery on a live person. Thus, an elastomeric material is selected to simulate the strength and elasticity of the arteries such as aorta 20 and heart 18. This allows more realistic training when cutting or suturing. A relatively thick-walled material is preferred for the heart 18 to simulate the appropriate resistance for manipulation and definition during surgery, but the wall should also be soft enough so that the heart wall is penetrable by suturing needles, yet is reasonably movable or rotatable by manipulation with a retractor.

Figure 2:
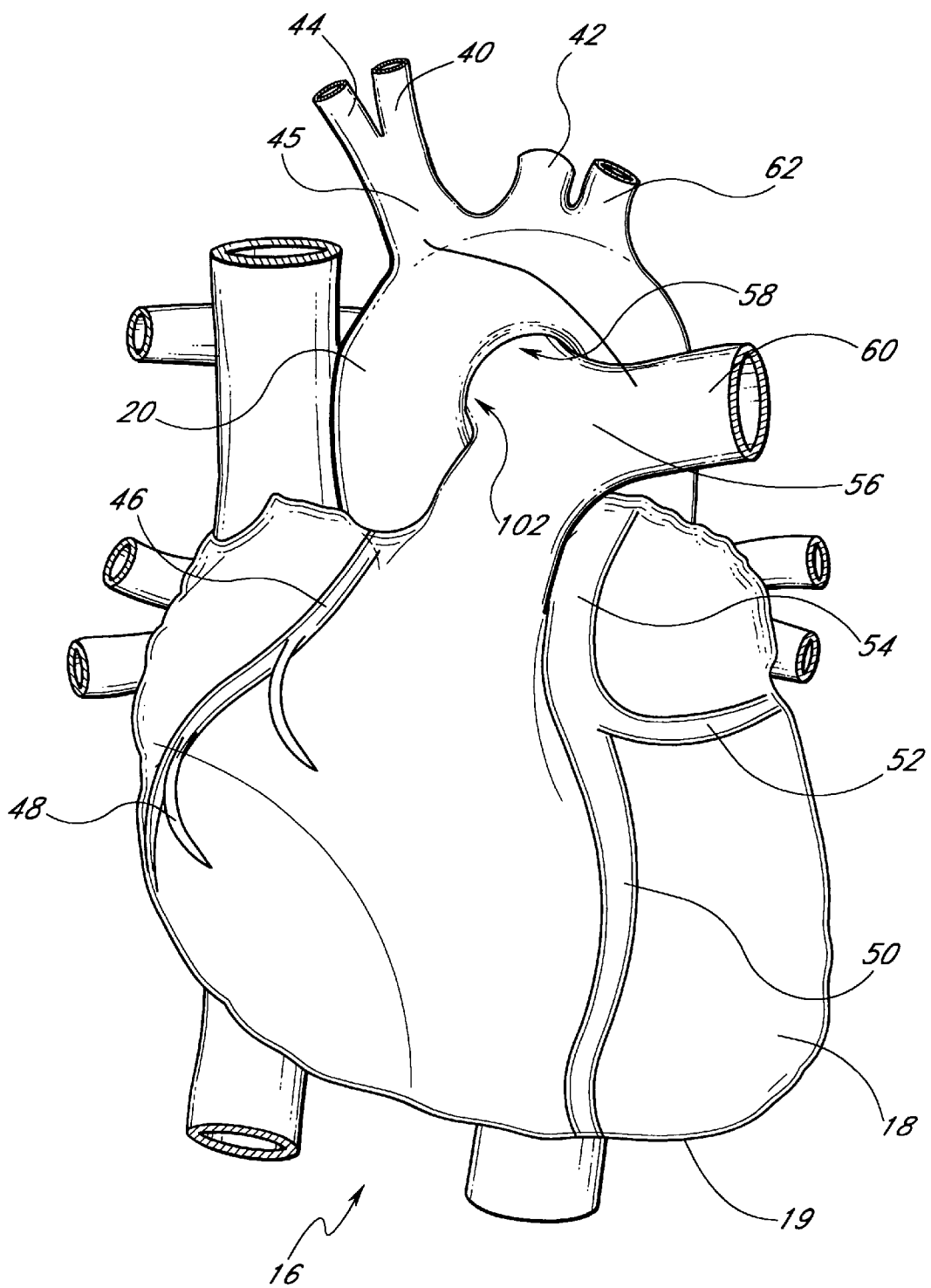
FIG. 2 is a schematic frontal view of one embodiment of the model heart.

Referring to FIGS. 2 and 3, the heart model 18 thus advantageously includes an aorta 20 with ascending and descending portions. It is advantageous in one embodiment to have only an ascending aorta 20 with a distal end sealed off to form a closed cavity inside the heart model 18. The heart 18 also includes a right coronary artery (RCA) 40, a left coronary artery (LCA) 42, a brachiocephalic (innominate) artery 45, a right subclavian artery 44, a right coronary artery (RCA) 46, a posterior descending artery (PDA) 48, a left anterior descending artery (LDA) 50, a left circumflex artery (LCX) 52, a left coronary artery (LCA) 54, pulmonary tank 56, right pulmonary artery 58, left pulmonary artery 60, and left subclavian artery 62. The branches of the coronary arteries may be few in number, and advantageously extend only a short distance before terminating. Alternatively, the branches of the coronary arteries may be eliminated for training purposes.

Referring to FIG. 3, various arteries extend around the surface of the heart model 18 open into an interior of the heart so that fluid simulating blood can circulate through the heart and arteries. An outflow valve 66 is provided to drain the fluid used to simulate blood. An IV bag 70 connected by an IV line 72 to the aorta 20 can supply fluid to the heart model 18. A pressure cuff 73 can be placed around the IV bag 70 with a manometer 74 and balloon inflator 76 used to vary the pressure of the fluid used to simulate blood.

Because the surgeon is working within a small operative field, through an 8-cm incision or through tiny endoscopic ports, it is advantageous that the reflection and transmission of light within the chest cavity of the model 10 reproduce that found in the live human chest. This enables the surgeon to place a light source in the proper location for surgical illumination. It further allows the surgeon to view the operative site (through a loupe worn on the eyeglasses, or through an endoscope) in a realistic manner. Thus, parts of the model 10 are selected to simulate realistic levels of illumination in the chest cavity of the model 10. This particularly includes the skin 14 and the walls of the various blood vessels. It is especially advantageous for the arteries to simulate realistic transmission of light if possible, especially in those areas where the endoscope will pass or where cutting is desired.

Standard CABG procedures provide for cross-clamping of the aorta. Although minimally invasive CABG procedures call for occlusion of the aorta via an endo-aortic balloon inserted through the femoral artery, some procedures by allow the aorta 20 and pulmonary trunk to be cross-clamped together. In order to simulate this coincidental cross-clamping of the aorta 20 and the pulmonary trunk 56, the model 10 advantageously has a connection between the aorta 20 and at least one of the pulmonary arteries 58, 60, which accurately simulates the aortopulmonary ligament found in humans.

If the model 10 is sufficiently accurate, existing surgical instruments may be used in the model, and there is no need for special instrumentation unique to the training model. Furthermore, surgeons may possibly also be able to practice performing a MIDCAB operation (i.e., that performed on a beating heart) on the training model. Certain embodiments, however, can utilize the model for practicing the port-access procedure, which uses an arrested heart.

Referring to FIGS. 2–3, the model 10 advantageously uses a single-chamber heart 18, which incorporates the right and left atria and the right and left ventricle into a single chamber 80. Blood-colored fluid 82 ("blood") will flow from this chamber 30 into the three main coronary arteries, which are the left anterior descending (LAD) artery 50, the right coronary artery (RCA) 40, and the left circumflex (LCX) artery 52. Blood will drain through the coronary arteries, from proximal to distal, back into the heart chamber 80. The entire heart apparatus is disposable in certain embodiments.

Figure 6:
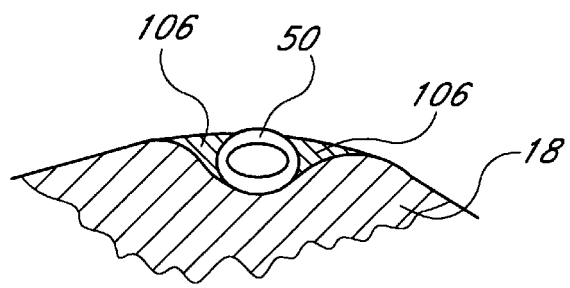
FIG. 6 is a close-up, cross-sectional side view of one embodiment of the model coronary artery and heart wall.

Preferably, the coronary arteries taper from approximately 3.5 mm at their ostia (proximal origin) to approximately 2.5 mm at their distal end, where they insert into the heart wall. This taper mimics the physiological taper and provides resistance, in order to distend the arteries as blood flows through them. Desirably, at least one, advantageously several, and preferably all of the arteries on the heart 18 that will be cut during surgical training, are recessed into the tissue of the heart 18. As seen in FIG. 6, an artery, for example LAD 50, is at least partially surrounded by the tissue of the heart 18, with vascular fatty tissue 106 on exterior sides of the artery 50. Normally, the exterior of the artery 50 is flush with the exterior surface of the heart 18, and that construction is preferred for the heart 18.

In training, the surgeon often must dissect the internal mammary artery from the anterior wall of the chest, and anastomose (hook-up) at least one of the internal mammary arteries (90 or 92) to the "diseased" left anterior descending (LAD) artery 50, which runs along the anterior of the heart 18. Minimally invasive CABG procedures are most easily performed on the arteries that run along the anterior surface of the heart, i.e., the left anterior descending artery 50 and, sometimes, the right coronary artery 40. On the arrested heart, however, it is possible to perform bypass grafting on other arteries, using endoscopic techniques. The model 10 will allow the surgeon to practice grafting all of the major arteries of the heart. This includes the left anterior descending (LAD) artery 50, the right coronary artery (RCA) 40 and the left circumflex (LCX) artery 52.

The main pulmonary artery trunk 56 arises from the right ventricle and divides into the right and left main pulmonary arteries 58, 60. No flow of blood-colored solution through the pulmonary trunk or pulmonary arteries is required in the training model, although such flow may be added to readily indicate if the pulmonary arteries are damaged during training.

Advantageously, all three main branches of the ascending aorta 20 and aortic arch are included in the training model 10. These include the brachiocephalic artery (also called the innominate artery) 45, which divides into the right subclavian and right carotid arteries 44, 40. Also included are the left carotid artery 42, and the left subclavian artery 44.

The space between the main pulmonary trunk 56 and the ascending aorta 20 is the transverse sinus 102. The model of the heart 18 advantageously has this space 102 well-defined, to facilitate placement of the aortic cross-clamp.

Preferably, an infusion pump 104 will control the flow of blood 82 through the heart chamber 80 and through the three main coronary arteries. This pump can be manually or electronically controllable, using techniques known to those of skill in the art. One fluid flow mechanism is illustrated simplistically in FIG. 3, as the IV bag 10, cuff 73 and associated equipment. Other, more sophisticated pumps can be used as will be apparent to one skilled in the art given the present disclosure. Thus, the use of powered fluid pumps is also contemplated, in addition to the gravity and pressure-fed pump illustrated.

As mentioned, blood-colored fluid 82 can flow in the lumens in order to simulate bleeding during training. This is preferably accomplished with a fluid system in fluid communication with the heart and providing pressurized fluid to the coronary artery, such that cutting the artery simulates bleeding as the pressurized fluid effuses from the artery. Advantageously the fluid 82 flows in a circuit in the following manner: Blood 82 flows from the infusion pump 104 (or, e.g., IV bag 70) into the aorta 20, preferably through the brachiocephalic (innominate) artery 45, although other locations can be used for the blood inlet. The blood 82 is in fluid communication with, and preferably circulates through the aortic root and right and left main coronary arteries 46, 54. The blood 82 is in fluid communication with and preferably circulates form there, through the coronary ostia which comprise openings for arterial branches. Next, blood 82 is in fluid communication with, and preferably flows through the right coronary artery 40 and the two main branches of the left coronary artery (the LAD 50 and the LCX 52), from proximal to distal. At the distal end of the coronary arteries, blood 82 enters the solitary heart chamber 80. The blood 82 is in further fluid communication with, and preferably flows from single heart chamber 80 through an outlet 66 which is in fluid communication, preferably through the bottom of the model 10, with a fluid reservoir (not shown) or with the pump 104.

If a pump is used instead of a gravity-fed IV bag, the blood 82 can be continuously circulated at a predetermined pressure selected to simulate realistic bleeding conditions during surgery. If the blood 82 does not circulate, then there is advantageously provided a pressurized system with a fluid source selected to provide blood 82 in sufficient quantity and pressure to simulate bleeding as the blood containing lumens are cut during surgical training. In some embodiments, the blood 82 is circulated from the heart 18 to the internal mammary artery system 24, in which case the outlet 66 is in fluid communication with the internal mammary artery system 24, preferably through the single leg of the Y-shaped inlet 96 (FIGS. 4, 5, 7), and with the single leg of the Y-shaped outlet 94 (FIGS. 4, 5, 6) being in fluid communication with the pump 104, or alternative IV bag 70 and vent 108.

Preferably, the aortic valve 56 (FIG. 3), which lies between the aorta 20 and the heart 18, is sealed off so as to prevent flow from the heart chamber 80 into the ascending aorta. This simplifies the model, without impeding training. Further, the main pulmonary artery trunk 56 may alternatively be filled with blood-colored solution 82 for each procedure, and sealed off from the blood 82 in the single chamber 80. Thus, while no blood 82 flows through the pulmonary arterial system in this alternative version, blood 82 may be kept in the pulmonary trunk 56 as a reservoir, so as to "bleed" if the surgeon accidentally nicks the pulmonary trunk during training.

While the components of the model 10 are advantageously sized to correspond to the realistic sizes of the actual body parts, in a preferred embodiment the heart 18 is slightly larger than anatomical, preferably about 10% larger, to facilitate surgical training.

Referring to FIG. 4, the model 10 advantageously includes a replaceable unit containing the internal mammary or internal thoracic arteries 24. There are thus advantageously provided left and right internal mammary arteries 90, 92, respectively. In the body, these arteries are used to revascularize the patient's diseased, native coronary arteries. The right and left internal mammary arteries 90, 92 run along the underside of the anterior or front wall of the chest, on either side of the sternum 93.

Advantageously there are both a left internal mammary artery (LIMA) 90 and a right internal mammary artery (RIMA) 92. These arteries, like the other arteries in the model 10 that may be cut or sutured in the model 10, are advantageously made of material which simulates the elasticity, compliance, and resilience of human arteries of similar caliber, and they should be of representative diameter. The texture of the cardiac arteries should be similar to the LIMA 90 and RIMA 92 in order to facilitate good sealing integrity following suturing anastomosis. Preferably, they are of similar thickness and material to facilitate sealing by suturing.

The material used in the arteries preferably can be sutured, and provides a drag similar to the drag incurred during suturing a real artery with endoscopic techniques. For general reference, the drag experienced by manual suturing is typically magnified 2–3 times when using endoscopic techniques. Further, some arteries, like the aorta 20, may have holes punched in them for aortic anastomosis, and the material preferably simulates the correct resistance when punching the hole without betting caught by, or binding, the punching blade. Further, the material used for the arteries should not allow the arteries to collapse. The arteries themselves preferably originate from the heart 18 in the anatomically correct location and extend from or along the heart 18 in the anatomically correct direction, spacing and location.

The cardiac arteries to be used in a bypass procedure, such as the LCX, LAD, PDA and RCA, advantageously taper in diameter. Thus for example, the LCX may have a diameter of about 3.5 mm, tapering through diameters of 3.25 mm, 3.0 mm, and 2.5 mm. The preferred diameter for a bypass is a little under 3.0 mm, and the variable diameter arteries helps train the surgeon where to locate the bypass.

While not preferable, an ordinary IV line can provide a marginally acceptable approximation for comparably sized arteries. The relative stiffness of the arteries 90, 92 is also important, because they bend as they are attached to form a graft, and if bent too much and the stiffness is incorrect, the arteries 90, 92 may kink and block blood flow. The coronary arteries, e.g., RCA 46, should be similar in texture and structure to the internal mammary arteries (LIMA and RIMA) 90, 92, in order to facilitate good coaptation and scaling integrity following the anastomosis of the internal mammary artery to the coronary artery.

The surgeon uses the right internal mammary artery (RIMA) 92 or, more commonly, the left internal mammary artery (LIMA) 90, for the bypass graft. The training model 10 thus preferably uses a realistic RIMA and LIMA, which are disposable. This allows harvesting of these veins for endoscopic grafting. Alternatively, the model 10 could be used to connect a model of a saphenous vein graft proximally to the ascending aorta, and distally to the coronary artery.

The RIMA 92 and LIMA 90 are linked together at their distal ends, near the xiphoid angle, at the lower end) of the sternum. This linkage may allow for a closed circuit fluid flow, permitting the continuous flow of blood 82 through the internal mammary artery apparatus 24. The flow of blood 82 can be provided by connecting the internal mammary artery apparatus 24 to the blood 82 in the heart 18, or by providing a separate fluid supply like that used for the heart 18, with a pump to circulate the blood. While blood 82 advantageously circulates through the internal mammary artery apparatus 24, it could alternatively comprise a pressurized system that flows only when cut, with a fluid supply and flow control sufficient to provide bleeding sufficient to simulate realistic surgical conditions.

Advantageously the arteries 90, 92 are joined at an upper end 94 and a lower end 96 to form a circular loop through which simulated blood 82 can circulate. An IV line 98 can be connected to one end, preferably upper end 94, to provide a source for the fluid used to simulate blood 82, in one embodiment. As mentioned, a circulating system with a circulating pump could also be used. Optionally, a valve 99 can be provided at the lower end 96 to allow filling and draining of the fluid, with the IV line 98 providing a fluid source to simulate bleeding when the arteries 92, 94 are cut.

The internal mammary artery apparatus 24 is preferably made of a material that can tolerate electrocautery, if electrocautery will be used for dissection. The LIMA 90 and RIMA 92 are preferably accurately positioned along their anatomic course. They should each have approximately 8 to 10 side branches 95 that are capable of "bleeding," so as to recreate normal physiologic conditions. The side branches 95 extend for a predetermined distance, say about one inch, before terminating. The branches 95 are preferably variable in diameter, varying from larger toward the head end of the thorax, and smaller toward the lower portion of the thorax. Further, the internal mammary artery system 24 preferably varies in diameter, with a diameter of about 2.5–3 mm at the distal end near the xiphoid angle, a diameter of about 3–3.2 mm at the middle, and a diameter of about 3.25–3.5 mm at the proximal end.

Further, the internal mammary artery system 24 preferably, but not necessarily, has a thin layer, about 1–2 mm thick, of material covering the arteries 90, 92 and surrounding area, to represent the muscular, fatty tissue normally surrounding these internal mammary arteries. Preferably, the material is yellow colored. This layer is preferably made of a material that can tolerate electrocautery, if electrocautery will be used for dissection.

Advantageously the internal mammary artery apparatus 24 comprises a unitary part that is formed on, or alternatively, removably connected to, the interior side of a sternum 93. Because the sternum is not split or opened, it is preferably removable to allow easy access to the replaceable internal mammary artery apparatus 24. The sternum 93 preferably comprises a representation of the sternum from the manubrium to the xiphoid, and extending about two inches laterally to the parasternal border on each side. While the sternum 93 is preferably represented as above, in a less preferred, alternative embodiment it may be omitted as long as there is a suitable representation of the sternum 24 to correctly position the internal mammary artery apparatus 24. Various mechanisms may be used to removably fasten the sternum 93 to the frame forming model 10. Preferably the sternum 93 is fastened to the ribs 23 by any of various removable fasteners, including, but not limited to, hook and loop fasteners, snaps, buttons, twist-lock screws, or other means.

Figure 5:
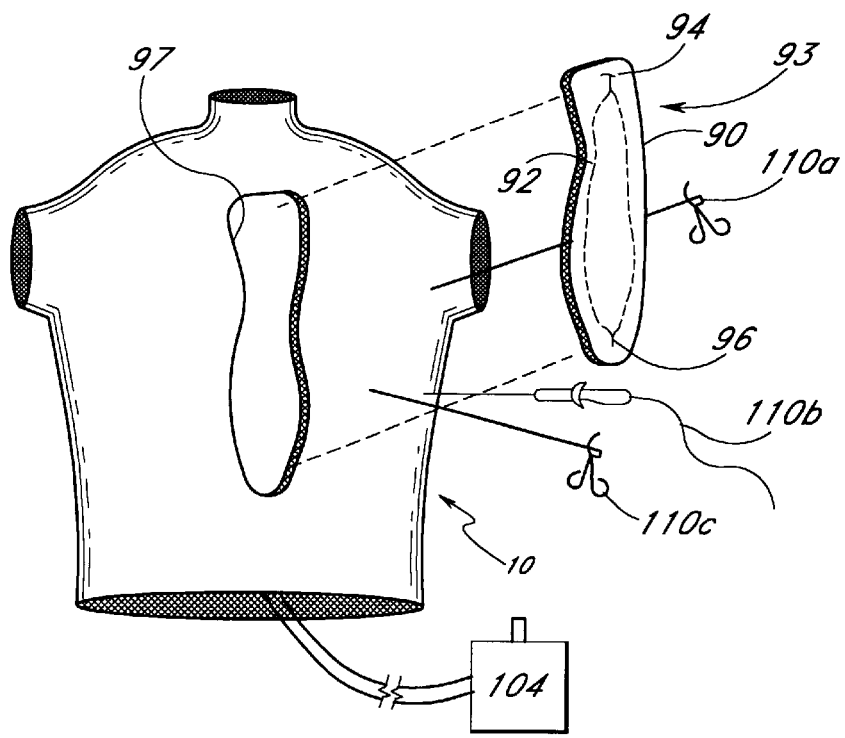
FIG. 5 is a frontal exploded view of the thoracic model, with sternum and endoscopic instruments.

Referring to FIG. 5, preferably, the internal mammary artery apparatus 24 is mounted to a support, preferably a the sternum 93 or a representation of the sternum 93, and placed into a cavity 97 in the anterior of the model 10 that is configured to receive and hold the internal mammary artery apparatus 24 in position. Preferably it is inserted from the exterior of the model 10, and then covered with the skin 14. The internal mammary artery apparatus 24 is removably mounted so that it may be discarded after use. The fixed location of cavity 94 in the model 10, and the fixed position of the internal mammary arteries 90, 92 on the apparatus 24, provide an easy way to repeatably position the internal mammary arteries 90, 92. This makes it possible to dispose the internal mammary artery apparatus 24 after each use, and quickly insert new ones. Thus, there is advantageously provided a sternum assembly comprising a sternum 93 removably insertable into the model 10, with an internal mammary arterial system 24 fastened to the interior of the sternum 93. It is possible to removably fasten the internal mammary arterial system 24 to the removable sternum 93. The internal mammary arterial system 24 is configured to be connected to the fluid supply to simulate the flow of blood 82, and is preferably configured to be removably connected to that fluid supply by detachable fluid couplings. Preferably the fluid couplings are made internal to the model 10 by reaching through the neck opening or through the bottom opening of the model 10.

The internal mammary artery system 24 is preferably actual size, although it may be made slightly larger, e.g., five percent or so, for training. Further, it is preferable that a larger than normal space be formed between the anterior surface of the heart 18 and the posterior surface of the sternum 93 to which the internal mammary artery system 24 is mounted. A space of about 3 to 3.5 inches is believed suitable. Because of the instrument manipulation that occurs in this space anterior of the heart 18, the added space is useful for training. In some models 10, it may be desirable to have a closer space so that as experience is gained in the surgical techniques, the spacing anterior of the heart 18 more closely simulates the actual anatomical configuration.

The pericardium 19, also called the pericardial sac, is the outer covering layer of the heart 18. This pericardium 19 should be made of a disposable material, as it will be incised with each operation, in order to gain surgical access to the coronary arteries. The pericardium is made of a material, preferably an elastomer, selected to simulate the elasticity, compliance, resilience and transparency of pericardium.

Advantageously the heart 18 is removably connected to the posterior median of the model 10 by a connector 85 having sufficient connection rigidity to allow reasonable movement and rotation by manipulation with a retractor as may accompany cardiac surgery, without causing the heart 18 to move out of position. Various removable fasteners can be used, including hook and loop fasteners, or mating male and female connectors that hold the heart 18 in position. The heart 18 should be positioned anatomically correct in relation to the central or mid line of the body, and the heart 18 should be shaped anatomically correct. The heart 18 may advantageously be removed and inserted into the model 10 through one of the openings opening at the neck or at the bottom of the thorax.

In this connection, the lungs 30 provide lateral positioning and support for the model of the heart 18, and mark the intra-thoracic anatomy. Preferably the lungs 30 are not inflated, but are in a collapsed or semicollapsed state. With the lungs 30 in this collapsed state, the anterior surface of heart 18 extends about half-way above the anterior surface of the lungs 30. The lungs 30 will not interfere with the insertion or positioning of the endoscopic instruments 110a–c (FIG. 5). The lungs may advantageously, but not necessarily, be made of an foam-type elastomer. It is not preferred to have rigid lungs 30, or lungs that cannot be moved to allow access to the heart 18.

The skin 14 advantageously extends over the entire surface of the model 10 as would normal skin. It essentially forms a removable jacket that may be releasably fastened from the back or posterior aspect of the model, as by a zipper, buttons, hook and latch fasteners, or other fastening means. The jacket of skin 14 is preferably discarded after each use of the model 10. The skin 14 advantageously includes a thickness representative of, and preferably accurately simulates, the muscle and tissue underlying the skin at the various portions of the thorax. Advantageously the anatomical simulation is sufficient to permit palpating for the correct intercostal space to place surgical instruments. Preferably, the skin 14 has nipples that correspond well with the fourth intercostal space.

The skin 14 is advantageously made so it represents a thinner than normal layer of skin and underlying tissue, because that makes it easier to define the intercostal spaces. The correct identification of the location for the portholes through which instruments are inserted is important. A thinner skin also makes the model 10 lighter, and reduces cost.

The material selected for the skin 14 is preferably an elastomer or fabric that has a resiliency similar to flesh so that a surgeon can define the intercostal spaces to place surgical instruments, and so that the insertion of endoscopic instruments presents a realistic simulation. The model 10 thus allows training with only endoscopic techniques and instruments, without making an 8-cm "keyhole" incision. The skin 14 is advantageously formed with a connector, such as a zipper, extending along the length of the model 10 and skin 14, to help easy installation and removal of the skin 14. An elastomer is preferred to be used for the skin 14 so it may be stretched slightly when installed on the model 10.

The surgeon may thus use the model 10 to acquire the skill of locating the proper site for making a thoracotomy, the hole in the chest. The model 10 thus uses a synthetic skin that covers the thorax. The surgeon must locate the space between the fourth and fifth ribs 28 in the midclavicular line in order to insert the endoscopic instruments. The midclavicular line is the line that runs along the longitudinal axis of the body and intersects the clavicle (collar bone) in the midpoint, between the sternum (breast bone) and shoulder.

The ribs 28 advantageously have anatomically correct spacing to define the correct spacings for location by the surgeon using the model 10. While the ribs 28 preferably have the same resilience as anatomical ribs, that is not necessary. Further, while the shape of the ribs 28 preferably replicates anatomical ribs, all that is necessary is that the ribs 28 be correctly sized and spaced to allow definition of the correct locations for the desired incisions. Thus, while not preferable, ribs made of plastic having a generally rectangular cross-section can be used. Further, a plastic shell can be cast and the spaces between the ribs 28 can be cut out to form at least the anterior and side portions of the model 10, and even the back—with a solid longitudinal strip representing the spine. While this is correct from an anatomical position, the precise configurations are not anatomically accurate and thus not preferred. Further, a recess can be formed into which the sternum 93 can be removably placed with the internal mammary arterial system 24.

Figure 7:
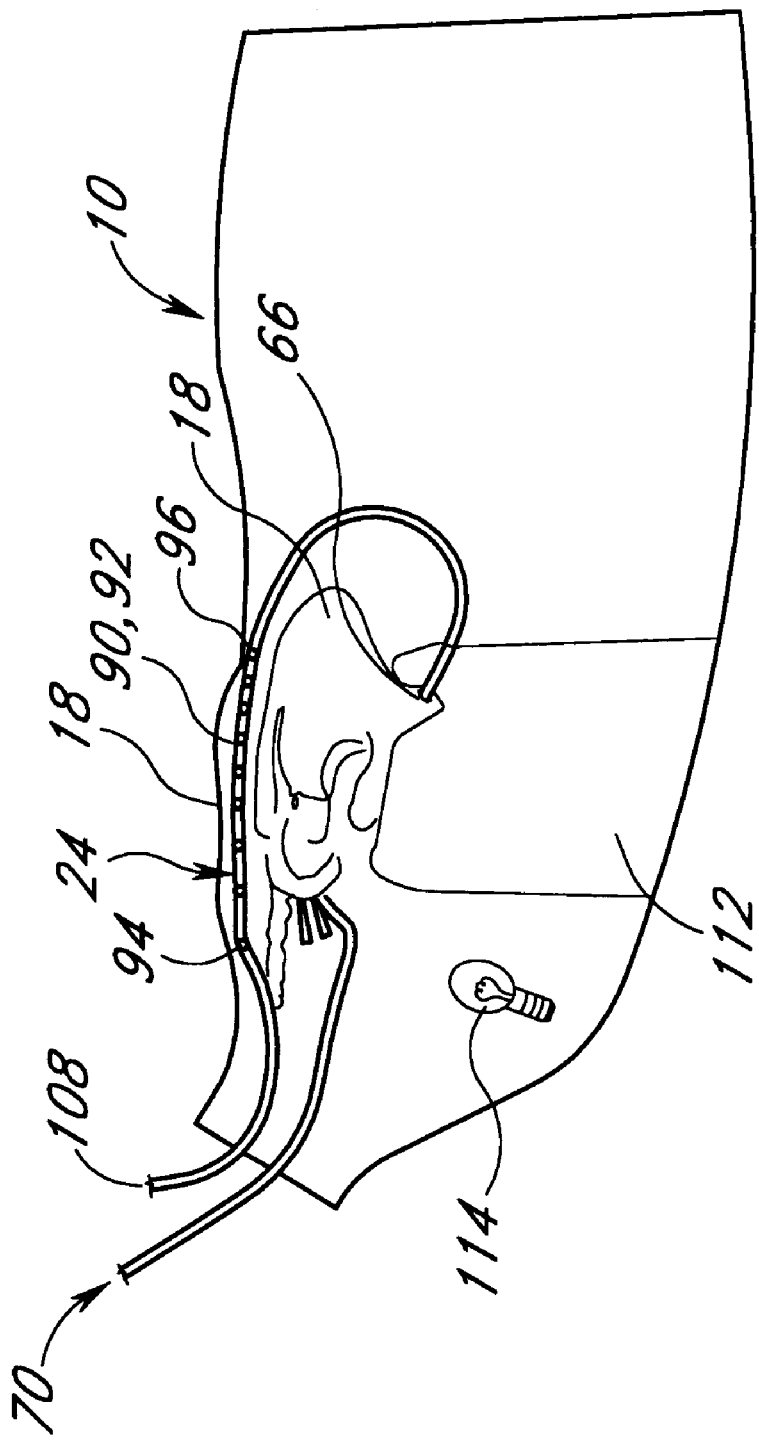
FIG. 7 is a cross-sectional side view of one embodiment of the thoracic model and fluid assembly.
Figure 8:
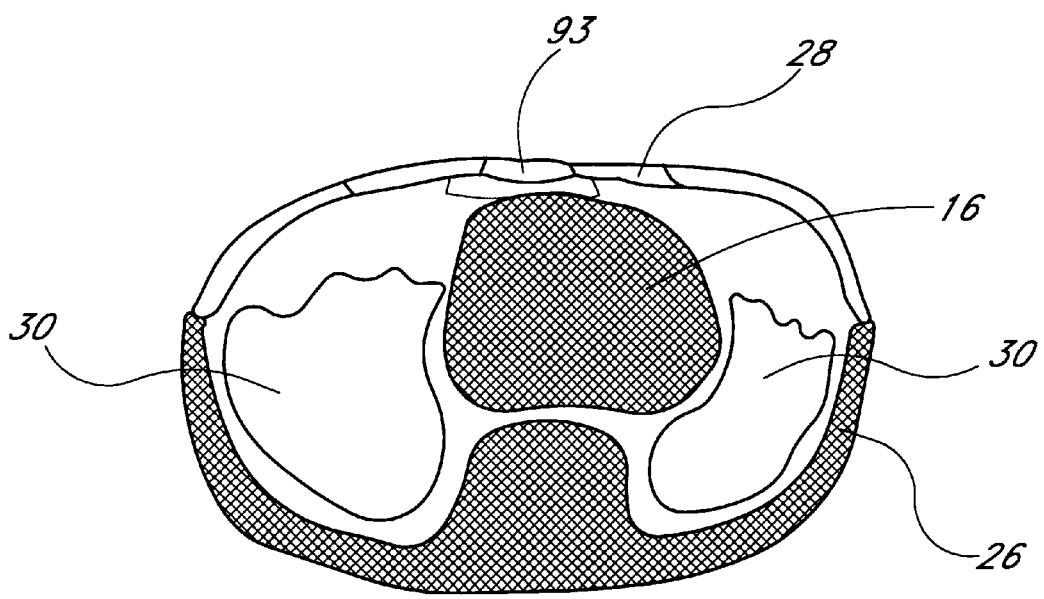
FIG. 8 is an axial cross-sectional view of one embodiment of the thoracic model.

Referring to FIG. 7, a cross-section of the model 10 shows a foam stand 112 used to position the heart 18 against the internal mammary artery assembly 24 and sternum 93 during shipping. Also shown is a light 114 in electrical communication with a power source (not shown), which is located inside the model 10. The light 114 is shown conceptually, but it could be placed to illuminate the interior of the model 10 and make it easier to define the ribs 28 by the shadow the light 114 causes the ribs 28 to cast onto the interior of the skin 14. The light 114 also can make it easier to see the heart 18 and various arteries for training purposes.

In a further embodiment of this invention, one or more of the heart 18, the arteries on the heart 18, the internal mammary artery assembly 24, the internal mammary arteries 90, 92, can be made smaller or larger than normal to make it easier or more difficult to perform the surgical techniques for training purposes. Similarly, the amount the arteries are recessed into the heart 18 or sternum can be varied to make it more difficult, or easier, to perform the desired surgical techniques.

In the present invention, the surgeon is taught the skill of locating the proper site for making the thoracotomy, the hole in the chest. The model thus uses a synthetic skin 14 that covers the thorax. The surgeon often locates the space between the fourth and fifth ribs in the midclavicular line in order to insert the endoscopic instruments 110a–c. The midclavicular line is the line that runs along the longitudinal axis of the body and intersects the clavicle (collar bone) in the midpoint, between the sternum 93 (breast bone) and shoulder.

There is thus advantageously provided a model 10 that has a heart 18 with at least the three major arteries represented for surgical use. The heart 18 is removably mounted, preferably from the bottom or top of the model 10, although a removable portion of the back or posterior of the model 10 could be provided to allow access to and replacement of the heart 10. The heart 18 is provided with a fluid source to simulate bleeding, and is preferably provided with a pressurized fluid source to simulate bleeding of arteries. The fluid is preferably under a pressure of greater than one atmosphere. This pressure can be provided by gravity, such as through the use of a fluid-containing IV bag which is elevated above the model. An internal mammary artery system 24 is provided in correct, or slightly larger spaced relation to the heart 18. The internal mammary artery system 24 is removably mounted, preferably from the anterior of the model 10. The internal mammary artery system 24 is provided with a fluid source to simulate bleeding, and is preferably provided with a pressurized fluid source to simulate bleeding of arteries. A skin jacket 14 is preferably, but not necessarily provided to simulate access difficulties, and to present accurate illumination conditions for endoscopic surgery. The model is covered by a removable, and preferably a disposable, jacket that simulates the skin and tissue enclosing the skeletal portion of the thorax.

The thoracic model can be used to interpose endoscopically a model vein graft between the coronary artery and a model aorta that is attached to the heart. The model vein graft can be sutured to the coronary artery and the model aorta. Alternatively, the surgeon trainee can endoscopically anastomose the coronary artery to the internal mammary artery.

The fluid system that simulates blood flow is optional, but provides several advantages. Because the heart 18 and internal mammary artery assembly 18 are fluid-tight, an unintentional nick of an artery can cause blood 82 to flow. That sort of mistake is best learned on a model rather than a live patient. Further, if the arteries are simulated sufficiently realistically, then the formation of a fluid tight anastomosis can be immediately seen and checked.

Moreover, the model 10 provides body parts with a realistic shape and performance, at least as to those parts that would be impacted by surgery. This provides realistic training on accessing, dissecting, cutting and suturing, all using endoscopic techniques. The use of a model with replaceable parts provides the ability to provide controlled and repeatable training conditions, and the ability to vary the level of difficulty appropriate to the level of experience of the person being trained.

The above advantages and features of the model are each suitable for use alone, or in various combinations with other features of this invention. The above description is given by way of illustration, not limitation. This invention is to be given the full scope of protection accorded by law, including equivalents of any features of this invention.

What is claimed is:

1. A surgical model for use with training for cardiac surgery using endoscopic techniques, comprising:

a thorax having an anterior aspect and a posterior aspect, the thorax comprising an internal cavity and a plurality of ribs;

intercostal spaces between the ribs through which an endoscopic instrument can be inserted during use of the model;

a heart located in the internal cavity and removably connected to the model, the heart comprising a coronary artery on which surgical training can be performed during use of the model;

a sternum located on the anterior aspect of the thorax; and at least one internal mammary artery located on a posterior surface of the sternum.

2. A surgical model as defined in claim 1, wherein the heart comprises two or more coronary arteries.

3. A surgical model as defined in claim 1, further comprising a skin removably attached to the model.

4. A surgical model as defined in claim 1, wherein the sternum is removably attached to the model.

5. A surgical model as defined in claim 1, wherein the skin further comprises at least one of a nipple or an umbilicus as a landmark.

6. A surgical model as defined in claim 1, further comprising a fluid system in fluid communication with the heart and providing pressurized fluid to the coronary artery, such that cutting the coronary artery simulates bleeding as the pressurized fluid effuses from the coronary artery.

7. A surgical model as defined in claim 1, further comprising a fluid system in fluid communication with the internal mammary artery and providing pressurized fluid to the internal mammary artery, such that cutting the internal mammary artery simulates bleeding as the pressurized fluid effuses from the internal mammary artery.

8. A surgical model as defined in claim 7, wherein the fluid system is in fluid communication with both the coronary artery and the internal mammary artery.

9. A surgical model as defined in claim 1, further comprising a pair of lungs on opposing sides of the heart.

10. A surgical model as defined in claim 9, wherein at least one of the lungs is collapsed.

11. A surgical model as defined in claim 1, wherein at least one of the arteries tapers, reducing in diameter from a proximal end to a distal end.

12. A surgical model as defined in claim 1, wherein the arteries are formed of a selected size, and formed of a selected material, selected to simulate at least one physical characteristic sensed by a surgeon performing endoscopic bypass surgery on a live person.

13. A surgical model as defined in claim 1, wherein there is a space between the posterior surface of the sternum and the anterior surface of the heart of about 3 inches.

* * * * *